US 10,409,302 B2

(12) United States Patent
Endou

(10) Patent No.: US 10,409,302 B2
(45) Date of Patent: Sep. 10, 2019

(54) CONTROLLER WITH COOLANT MONITORING FUNCTION

(71) Applicant: FANUC CORPORATION, Yamanashi (JP)

(72) Inventor: Takahiro Endou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/334,259

(22) Filed: Oct. 25, 2016

(65) Prior Publication Data
US 2017/0139432 A1 May 18, 2017

(30) Foreign Application Priority Data
Nov. 17, 2015 (JP) ................................. 2015-224939

(51) Int. Cl.
G05D 23/19 (2006.01)
G05D 23/275 (2006.01)
B23Q 11/10 (2006.01)
B23Q 17/00 (2006.01)

(52) U.S. Cl.
CPC ......... G05D 23/1917 (2013.01); B23Q 11/10 (2013.01); G05D 23/1927 (2013.01); G05D 23/275 (2013.01); B23Q 17/007 (2013.01); G05B 2219/50324 (2013.01)

(58) Field of Classification Search
CPC ................. G05B 2219/50324; B23Q 17/007
USPC .................................................... 361/679.53
See application file for complete search history.

(56) References Cited

U.S. PATENT DOCUMENTS

| 6,555,379 B1 | 4/2003 | Bremer et al. |
| 2007/0151806 A1* | 7/2007 | Boyle ................ G01N 33/2888 184/6.21 |
| 2008/0245159 A1* | 10/2008 | Garshelis ................ G01L 3/102 73/862.27 |
| 2010/0178001 A1 | 7/2010 | Matsunaga |
| 2011/0198194 A1* | 8/2011 | Tokhtuev ............... B65G 43/02 198/502.1 |

(Continued)

FOREIGN PATENT DOCUMENTS

| DE | 3429965 A1 | 3/1985 |
| DE | 19755477 A1 | 6/1999 |
| EP | 2208571 A1 | 7/2010 |

(Continued)

OTHER PUBLICATIONS

Werner, "An Early Warning Monitoring System for CNC Spindle Bearing Failure" Thesis, Clemson University, Dec. 2011, 227 Pgs., (Year: 2011).*

(Continued)

Primary Examiner — Emilio J Saavedra
(74) Attorney, Agent, or Firm — Hauptman Ham, LLP

(57) ABSTRACT

A controller for controlling a machine includes a coolant monitoring function. The controller generates and records history information in which the measurement values of a state of a coolant are associated with time information on the time when the measurement values are measured. Then, a rate of change in a measurement value for a state of the coolant is calculated based on the recorded history information, and a state of the coolant and a countermeasure therefore are determined based on the calculated rate of change in the measurement value.

4 Claims, 3 Drawing Sheets

(56) References Cited

U.S. PATENT DOCUMENTS

2015/0245539 A1* 8/2015 Pelletier .................. G06F 1/206
                                                           361/679.53

FOREIGN PATENT DOCUMENTS

| JP | 61-196136 A |   | 8/1986 |
|----|-------------|---|--------|
| JP | 2003-141310 A |   | 5/2003 |
| JP | 2010-162634 A |   | 7/2010 |
| JP | 2010-188480 A |   | 9/2010 |
| JP | 2010188480 A | * | 9/2010 |

OTHER PUBLICATIONS

Mehta et al., "Condition based maintenance-systems integration and intelligence using Bayesian classification and sensor fusion" Journal of Intelligent Manufacturing, Apr. 2015, vol. 26, Issue 2, pp. 331-346 (Year: 2015).*

Office Action in JP Application No. 2015-224939, dated Oct. 31, 2017, 6 pp.

Office Action in DE Application No. 102016121492.2, dated Mar. 1, 2019, 6pp.

* cited by examiner

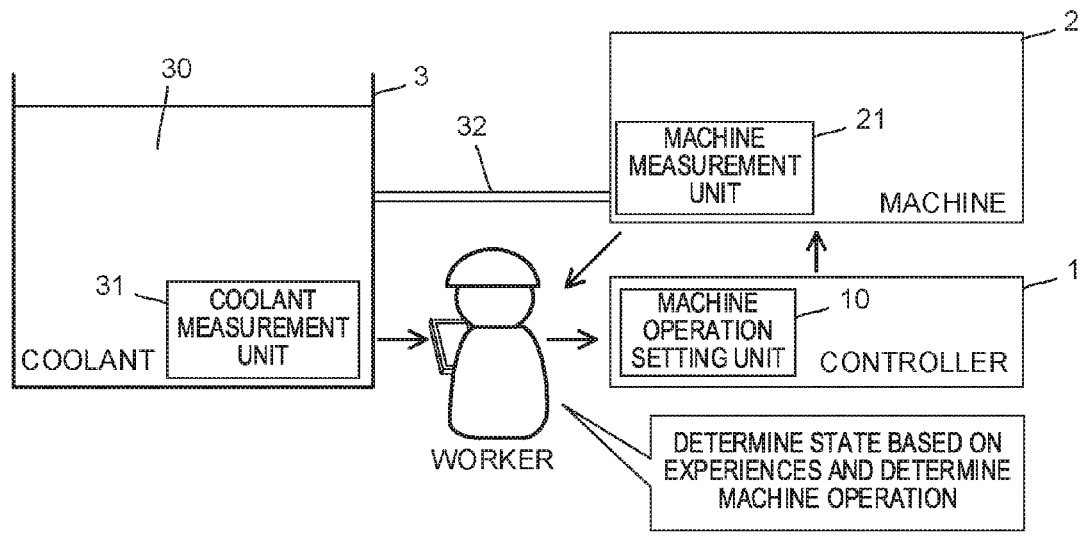
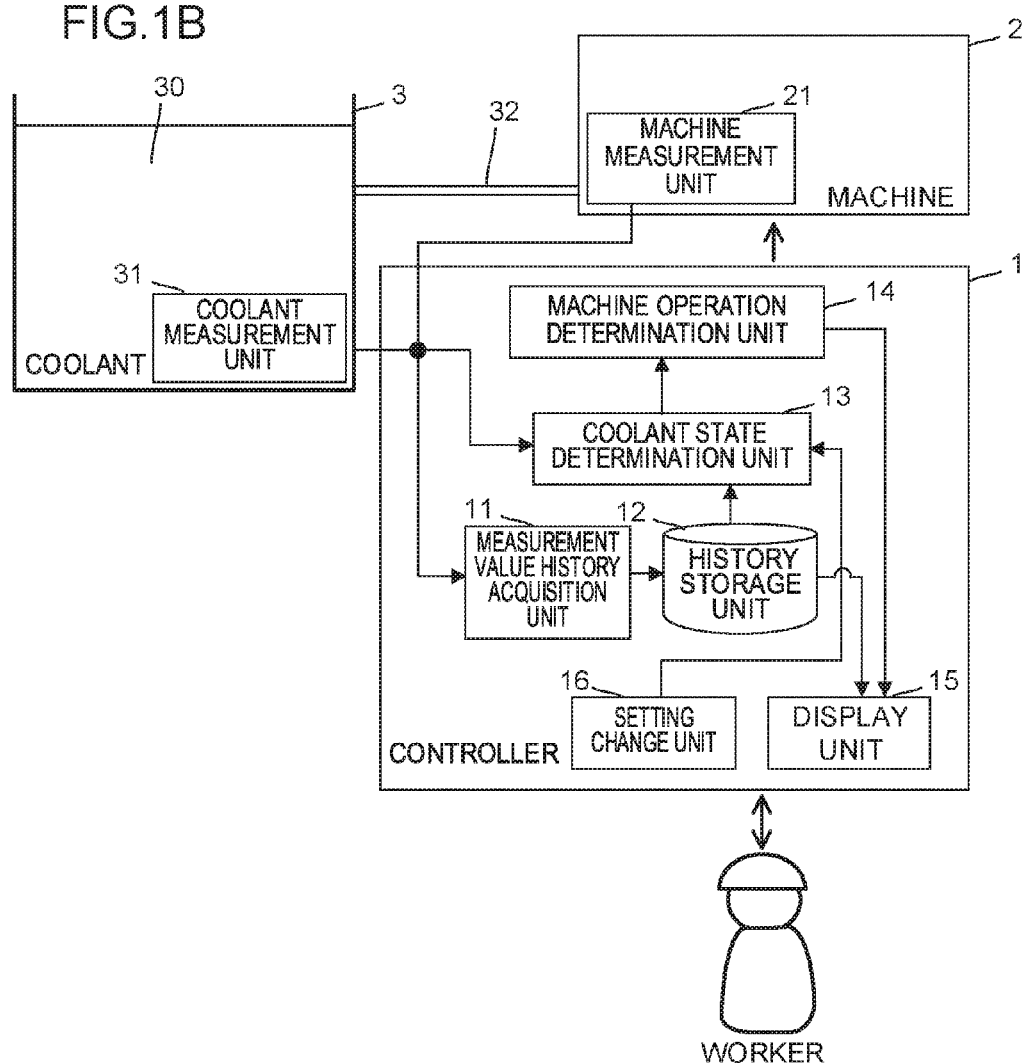

CONTROLLER WITH COOLANT MONITORING FUNCTION

RELATED APPLICATIONS

The present application claims priority to Japanese Patent Application Number 2015-224939 filed Nov. 17, 2015, the disclosure of which is hereby incorporated by reference herein in its entirety.

BACKGROUND OF THE INVENTION

1. Field of the Invention

The present invention relates to a controller with a function of monitoring a state of a coolant.

2. Description of the Related Art

A machine such as machine tool is supplied with a soluble or insoluble coolant (cutting fluid) during machining. The coolant is stored in a coolant tank and is supplied to the machine via a coolant supply pump coupled to the coolant tank. Then, the used coolant is removed to the outside of the machine while being attached on a workpiece, flows around the machine within a guard cover, and is returned to the coolant tank via a coolant recovery path to be adjusted in its fluid quality for reuse.

If a machining condition to be set during machining is not adjusted depending on fluid quality of a coolant when the machining is performed by use of the coolant, quality of the machining may be influenced.

As a conventional technique in terms of fluid quality of such a coolant, for example, Japanese Patent Application Laid-Open No. 2010-188480 discloses therein a technique for measuring fluid quality (pH, hardness, or concentration) of a coolant, comparing the measurement result with a preset threshold, and displaying a message or performing machine operation control depending on the comparison result.

Further, as a conventional technique for managing water quality of a fluid, for example, Japanese Patent Application Laid-Open No. 2003-141310 discloses therein a technique for storing detection data of a water quality detection device of a water processing facility in a management server, supplying detection result information via a communication line, and when an abnormality occurs or there is a risk that an abnormality might occur, determining a countermeasure.

When a coolant is reused while being repeatedly adjusted as described above, even if the fluid quality of the coolant grasped by a measurement value measured by a sensor such as concentration (see FIG. 3A) or pH (see FIG. 3B) is the same, as illustrated in FIG. 3A and FIG. 3B, the performance of the coolant may change over time due to influences of viable bacteria and impurities in the non-adjusted remaining coolant, such as an increase in speed (tilt of a line in FIGS. 3A and 3B) at which the coolant deteriorates (concentration or pH deteriorates). For example, in the examples of FIG. 3A and FIG. 3B, the measurement values with the same concentration and pH of the coolant are indicated at times (1), (2), and (3), while the deterioration speed is the lowest at time (1) and the highest at time (3).

In order to cope with the differences in performance of a coolant which cannot be grasped by a measurement value measured by such a sensor, conventionally a worker changes a machining condition based on information on a state and use duration of the coolant or an interval or the number of times of adjustment. However, the determination of deterioration largely depends on the worker's experience and limited workers can make an accurate determination, and there is a problem that even an experienced worker may differently make a determination.

SUMMARY OF THE INVENTION

It is therefore an object of the present invention to provide a controller for enabling an appropriate operation while a coolant is deteriorated to be determined irrespective of any experience of a worker.

A machine tool according to the present invention records the history of measurement values measured by a coolant measurement unit and calculates a rate of change in each measurement value based on the recorded history of measurement values. The above problem is solved by more accurately grasping a state of a coolant by using not only a measurement value of each sensor and a coolant use duration but also a rate of change in a measurement value for determining a state of the coolant.

A controller according to the present invention is configured to control a machine based on a state of a coolant used for machining by the machine. The controller includes: a history storage unit that records measurement value history information in which a measurement value for a state of the coolant is associated with time information on a time when the measurement value is measured; a measurement value history acquisition unit that controls a measurement unit configured to measure a measurement value for a state of the coolant thereby to acquire the measurement value from the measurement unit, generates measurement value history information based on the acquired measurement value, and records the generated measurement value history information in the history storage unit; a coolant state determination unit that calculates a rate of change in the measurement value for a state of the coolant based on the measurement value history information recorded in the history storage unit, and determines a state of the coolant based on the calculated rate of change in the measurement value; and a machine operation determination unit that determines an operation to be performed based on the state of the coolant determined by the coolant state determination unit and performs the determined operation.

When the rate of change exceeds or falls below a preset predetermined threshold, the coolant state determination unit may determine that a state of the coolant increases in its deterioration speed.

The measurement value can include at least any one of concentration of the coolant, temperature of the coolant, pH of the coolant, odor of the coolant, color of the coolant, turbidity of the coolant, bubbles of the coolant, viscosity of the coolant, motor loads of a main shaft and a feed shaft during machining of the machine, vibration during machining of the machine, and surface temperature of a workpiece during machining of the machine.

The operation performed by the machine operation determination unit may be a machining control operation of the machine or an operation of improving a state of the coolant, or both of them.

According to the present invention, an accuracy of determining a reaction to be made when a coolant is deteriorated is enhanced irrespective of any experience of a worker and a variation of worker-dependent determinations can be suppressed. Further, a work can be automated as needed when the coolant is deteriorated, thereby reducing labor cost.

BRIEF DESCRIPTION OF THE DRAWINGS

The forgoing and other objects and feature of the invention will be apparent from the following description of preferred embodiments of the invention with reference to the accompanying drawings, in which:

FIG. 1A is a block diagram illustrating an outline of a controller with a coolant monitoring function as a background technique of the present invention;

FIG. 1B is a block diagram illustrating an outline of a controller with a coolant monitoring function according to one embodiment of the present invention;

DETAILED DESCRIPTION OF THE PREFERRED EMBODIMENTS

Figure 2:
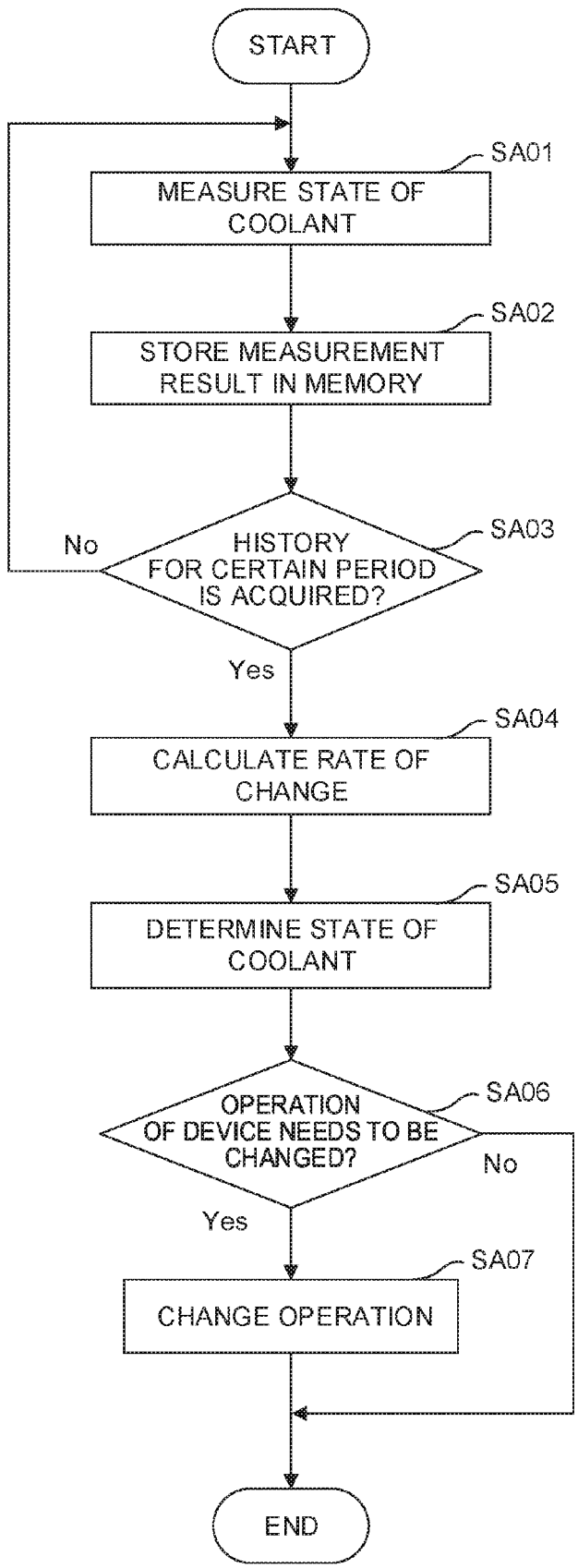
FIG. 2 is a flowchart illustrating a flow of processes performed on the controller of FIG. 1B.
Figure 3A:
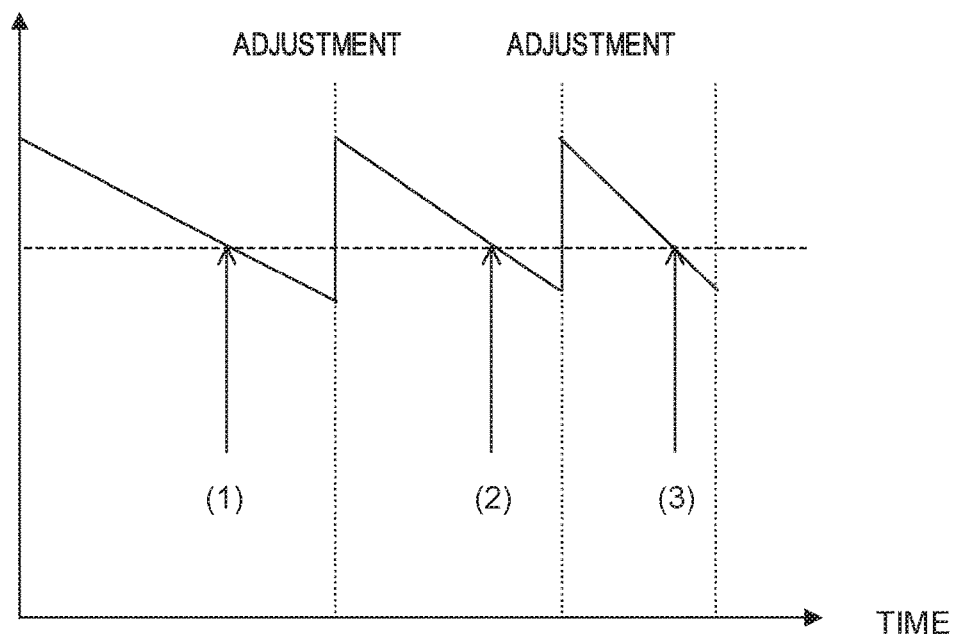
FIG. 3A is a diagram for explaining a time shif of a state (concentration) of a coolant.
Figure 3B:
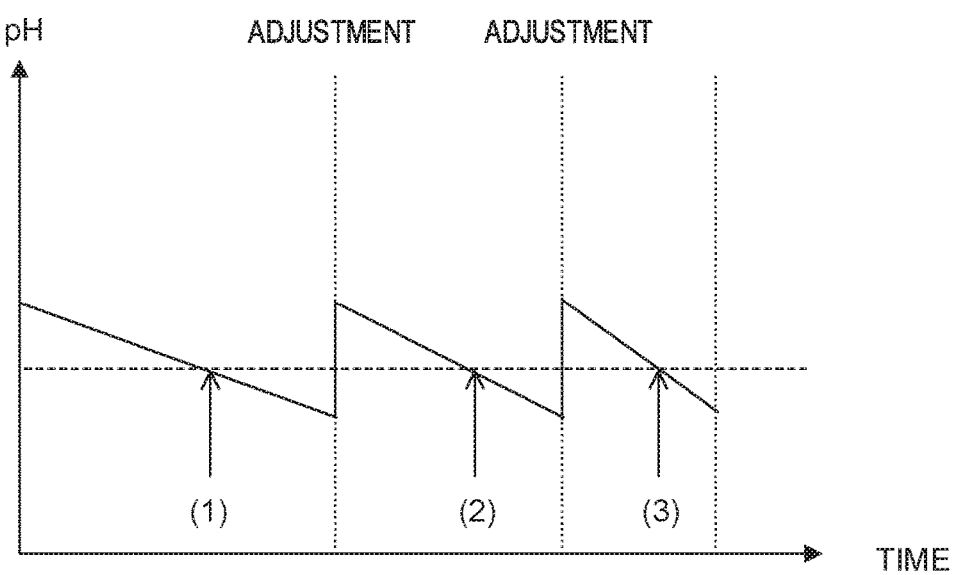
FIG. 3B is a diagram for explaining a time shif of a state (pH) of the coolant.

An outline of a controller with a coolant monitoring function as background technique of the present invention will be first described with reference to FIG. 1A before describing a controller with a coolant monitoring function according to one embodiment of the present invention.

In the conventional controller, as illustrated in FIG. 1A, when a worker performs machining with a machine 2, the worker measures concentration, temperature, pH, odor, color, turbidity, bubbles, viscosity, and the like of a coolant 30 stored in a coolant tank 3 by use of a coolant measurement unit 31 provided in the coolant tank 3 connected to the machine 2 via a coolant supply path 32.

The worker confirms the measurement result to determine a state of the coolant 30 based on his/her experience and operates a machine operation setting unit 10 as interface for setting an operation of the machine 2 of the controller 1, based on the determination result, thereby setting a machining condition for the machining using the coolant 30. The controller 1 then controls the machine 2 for machining according to the machining condition set by the worker.

The worker may indirectly determine a state of the coolant 30 based on motor loads of a main shaft and a feed shaft acquired from a machine measurement unit 21 during machining, vibration during machining, surface temperature of a workpiece, or the like.

In this way, according to the conventional technique, the worker serves to determine a state of a coolant and to determine an operation of the machine depending on the state of the coolant.

An outline of a controller with a coolant monitoring function according to one embodiment of the present invention will be described below with reference to FIG. 1B.

The controller 1 according to the present embodiment includes a measurement value history acquisition unit 11, a history storage unit 12, a coolant state determination unit 13, a machine operation determination unit 14, a display unit 15, and a setting change unit 16 as illustrated in FIG. 1B.

The measurement value history acquisition unit 11 controls the coolant measurement unit 31 provided in the coolant tank 3 to measure concentration, temperature, pH, odor, color, turbidity, bubbles, viscosity, and the like of the coolant 30 stored in the coolant tank 3, thereby acquiring the measurement values as the measurement result from the coolant measurement unit 31. The coolant tank 3 is connected to the machine 2 via the coolant supply path 32. During machining, the machine measurement unit 21 provided in the machine 2 is controlled to measure motor loads of the main shaft and the feed shaft during machining, vibration during machining, a surface temperature of a workpiece, and the like, thereby acquiring the measurement values as measurement result. The measurement values are acquired by the measurement value history acquisition unit 11 at a predetermined cycle of $\Delta t$.

The measurement value history acquisition unit 11 acquires the measurement values from the coolant measurement unit 31 and the measurement values from the machine measurement unit 21, and stores these acquired measurement values in the history storage unit 12 as measurement value history information associated with time, respectively. The stored measurement value history information can be stored depending on a size of the storage area prepared for the history storage unit 12 on a memory (nonvolatile memory such as CF card) (not illustrated) in the controller 1, and if the storage area is short of its capacity, the measurement value history information may be deleted from the oldest. The history storage unit 12 has only to store the measurement value history information for a measurement period T which is a period of the measurement value history information used at least by the coolant state determination unit 13 described later for determining a state of the coolant 30.

The coolant state determination unit 13 determines a state of the coolant based on the measurement value history information stored in the history storage unit 12. The coolant state determination unit 13 acquires the measurement value history information of each measurement value for the measurement period T from the history storage unit 12, and calculates a rate "a" of change in the value in the measurement period T for each measurement value in the following Equation (1). In Equation (1), $\Delta Y$ indicates the amount of change of a measurement value in the measurement period T.

$$a = \frac{\Delta Y}{T} \quad (1)$$

In the above, the amount of change $\Delta Y$ in a measurement value may simply be the absolute value of a difference between the first measurement value and the last measurement value in the measurement period T, or instead a statistically-found value obtained by finding an average of the absolute value of a difference between the measurement values in each measurement cycle in the measurement period T and multiplying the found average by the number of measurement cycles.

The coolant state determination unit 13 calculates a rate of change in each measurement value based on the measurement value history information, and then determines a state of the coolant 30 based on not only each measurement value but also the rate of change in each measurement value.

For example, assuming a rate of change in concentration as $a_c$, a concentration change rate $a_c$ is calculated based on a measurement value of concentration in the measurement period T stored as measurement value history information and then compared with a preset threshold of the concentration change rate, and if the concentration change rate $a_c$ exceeds the preset threshold of the amount of change, it is determined that the deterioration speed of the state of the coolant 30 is increasing. Further, when the value of concentration exceeds (or falls below) the present threshold of concentration, it is determined that the state of the coolant 30 is being deteriorating.

The coolant state determination unit 13 may determine a state of the coolant 30 by use of both (a combination) of the measurement values measured by the coolant measurement unit 31 and the machine measurement unit 21, or may determine a state of the coolant 30 by use of only the measurement values measured by either the coolant measurement unit 31 or the machine measurement unit 21. Further, a degree of deterioration may be determined in a stepwise manner by a plurality of thresholds, or a degree of deterioration may be determined based on a computation result of a function by use of not the thresholds but the function for determination.

The machine operation determination unit 14 determines an operation of the machine 2 or an operation for the coolant 30 based on the determination result of the state of the coolant 30 by the coolant state determination unit 13. The operation of the machine 2 may be changing a machining condition during machining, changing a machining condition used for machining, predicting and displaying a maintenance timing, or the like. Further, the operation for the coolant 30 may be determining the need of adjusting or exchanging the coolant 30, automatically adjusting or exchanging the coolant 30, and additionally predicting next adjustment, exchange, or exchange timing of the coolant 30, outputting a message for adjusting or exchanging the coolant 30, and the like.

For example, when a deterioration in state of the coolant 30 or an increase in deterioration speed of a state of the coolant 30 is determined based on the measurement value of concentration of the coolant 30 as described above, the machining speed is slowed down by decreasing the maximum value of the cutting feed rate of the machine 2 or adding dwell (standby) to the machining program, or a coolant adjustment unit (not illustrated) provided in the coolant tank 3 or the like is controlled to automatically adjust the coolant 30, and further the valve of a flow path for supplying the coolant tank 3 with a new coolant 30 is controlled to automatically exchange the coolant 30. Further, when the control cannot be automatically conducted, a deterioration in state of the coolant 30 may be notified to the worker to instruct him/her to perform each work.

Additionally, there may be assumed an example in which a temperature of the coolant is monitored, and if it exceeds a predefined temperature, the dwell program is executed, and if an increase in temperature is steep (when an abnormality may be caused in the machine), an alarm is output without performing the dwell.

The operation of the machine 2 or the operation for the coolant 30 determined by the machine operation determination unit 14 may be previously stored in the memory in a table in association with a state of the coolant 30 determined by the coolant state determination unit 13. At this time, a different operation of the machine 2 or a different operation for the coolant 30 may be associated with each determination result such as an increase in deterioration speed of each measurement value or a deterioration in measurement value itself, or a different operation of the machine 2 or a different operation for the coolant 30 may be associated with a combination of determination results such as an increase in deterioration speed of each measurement value and a deterioration in measurement value itself. An appropriate operation for a state of the coolant 30 may be previously set in the table in the memory by making experiments or interviewing skilled workers.

The display unit 15 displays the contents of an operation determined by the machine operation determination unit 14 or a state (such as deterioration state or deterioration speed state) of the coolant 30. Further, the measurement value history information stored in the history storage unit 12 is displayed in response to an operation of the worker.

The setting change unit 16 sets a value or threshold of a predetermined period T used by the coolant state determination unit 13, the contents of an operation determined by the machine operation determination unit 14, and the like in response to an operation of the worker.

FIG. 2 is a flowchart illustrating an example of flow of the processes performed by the controller 1 of FIG. 1B. The processes are performed at a predetermined cycle. The process in each step will be described below.

[Step SA01] The measurement value history acquisition unit 11 controls the coolant measurement unit 31 and acquires the measurement values indicating a state of the coolant 30 from the coolant measurement unit 31. Further, during machining, the measurement value history acquisition unit 11 controls the machine measurement unit 21 and indirectly acquires the measurement values indicating a state of the coolant 30 from the machine measurement unit 21.

[Step SA02] The measurement value history acquisition unit 11 records the measurement values (the measurement values from the coolant measurement unit 31 and the measurement values from the machine measurement unit 21) acquired in step SA01 as measurement value history information associated with time in the history storage unit 12.

[Step SA03] The measurement value history acquisition unit 11 repeatedly performs the processes instep SA01 and step SA02 before the period when the measurement value history information is stored in the history storage unit 12 reaches the predefined measurement period T, and when the stored period reaches the predefined measurement period T, the process proceeds to step SA04.

[Step SA04] The coolant state determination unit 13 calculates a rate of change in each measurement value based on the measurement value history information for the last measurement period T stored in the history storage unit 12.

[Step SA05] The coolant state determination unit 13 determines a state of the coolant 30 (state deterioration speed or deterioration situation of the coolant 30) based on the rate of change in each measurement value calculated in step SA04.

[Step SA06] The machine operation determination unit 14 determines whether or not a machining operation of the machine 2 or an operation for the coolant 30 needs to be changed based on the state of the coolant 30 determined by the coolant state determination unit 13 in step SA05. When an operation needs to be changed, the process proceeds to step SA07, and when it does not need to be changed, the process ends.

[Step SA07] The machine operation determination unit 14 determines and performs a machining operation of the machine 2 or an operation for the coolant 30 based on the state of the coolant 30 determined by the coolant state determination unit 13 in step SA05, and terminates the process.

The embodiment of the present invention has been described above, but the present invention is not limited to the embodiment described above and can be changed and accomplished in various forms as needed.

The invention claimed is:

1. A controller for controlling a machine based on a state of a coolant used for machining by the machine, the controller comprising:
   a storage device configured to record measurement value history information in which a measurement value for a state of the coolant is associated with time information on a time when the measurement value is measured; and a processor configured to control a sensor to measure a measurement value for a state of the coolant to acquire the measurement value from the sensor, generate measurement value history information based on the acquired measurement value, record the generated measurement value history information in the storage device, calculate a rate of change in the measurement value for a state of the coolant based on the measurement value history information recorded in the storage device, determine a state of the coolant based on a comparison of the calculated rate of change in the measurement value with a preset predetermined threshold, wherein the measurement value includes at least any one of motor loads of a main shaft and a feed shaft during machining of the machine, vibration during machining of the machine, and surface temperature of a workpiece during machining of the machine, determine an operation to be performed based on the determined state of the coolant, and perform the determined operation.

2. The controller according to claim 1, wherein when the rate of change exceeds or falls below the preset predetermined threshold, the processor is configured to determine that a deterioration speed of a state of the coolant increases.

3. The controller according to claim 1, wherein the measurement value further includes at least any one of concentration of the coolant, temperature of the coolant, pH of the coolant, odor of the coolant, color of the coolant, turbidity of the coolant, bubbles of the coolant, and viscosity of the coolant.

4. The controller according to claim 1, wherein the performed operation includes at least one of a machining control operation of the machine, or an operation of improving a state of the coolant.

* * * * *